United States Patent

Aldred et al.

Patent Number: 5,919,363
Date of Patent: Jul. 6, 1999

[54] FILTER HAVING PINCHED ENDS FOR IMPROVED SEALING EFFECT

[75] Inventors: Jeffrey K. Aldred, Boulder; Brian D. Hunter, Nederland; Kraig J. Koski, Longmont, all of Colo.

[73] Assignee: American Standard, Inc., Piscataway, N.J.

[21] Appl. No.: 09/057,272

[22] Filed: Apr. 8, 1998

[51] Int. Cl.[6] .................................................. B01D 29/31
[52] U.S. Cl. ................ 210/232; 210/497.01; 210/510.1; 210/446; 29/896.62; 55/498
[58] Field of Search .............................. 210/232, 497.01, 210/510.1, 446; 29/896.62; 55/498

[56] References Cited

U.S. PATENT DOCUMENTS

| | | |
|---|---|---|
| 2,365,766 | 12/1944 | Levier . |
| 2,955,712 | 10/1960 | Gutkowski . |
| 2,991,885 | 7/1961 | Gutkowski . |
| 3,270,884 | 9/1966 | Bremer . |
| 3,282,434 | 11/1966 | Pall . |
| 3,386,587 | 6/1968 | Mast . |
| 3,400,821 | 9/1968 | Singleton . |
| 3,767,054 | 10/1973 | Farrow . |
| 4,105,561 | 8/1978 | Domnick . |
| 5,580,447 | 12/1996 | Platter et al. ............................ 210/206 |

*Primary Examiner*—Thomas M. Lithgow
*Attorney, Agent, or Firm*—Duft, Graziano & Forest, PC; Dan Cleveland, Jr., Esq.

[57] ABSTRACT

A filtration cartridge (20) uses a swage channel (50) to form a water-tight seal between a sealing element (26) and a semi-rigid filter (28).

9 Claims, 1 Drawing Sheet

FILTER HAVING PINCHED ENDS FOR IMPROVED SEALING EFFECT

SUMMARY OF THE INVENTION

The present invention pertains to the field of filtration cartridges including a compressive seal at remote ends of a filter to place the filter in sealing engagement a cartridge body. More specifically, the compressive seal is particularly well suited for use with semi-rigid deformable filters, such as blocks of activated carbon or fibrous labrynth depth filters having a resin binder.

PROBLEM

An inherent problem to the filtration cartridge art is one of attaching the filter to the filtration cartridge body in a manner that prevents leakage from bypassing the filter. Filters may be divided into several subclasses. Flexible filters, such as crushed paper and fabrics, cannot support a compressive axial load that is strong enough to form a seal when the filter is compressed at opposed ends. The materials from which these filters are made can be compressed to remove porosity and permeability from the compressed region of the filter. Thus, adhesives or mechanical locking mechanisms are used to hold the filter in fixed relationship with respect to the filtration cartridge body.

Rigid filters, particularly, ceramic or porcelain filters, are used to remove microbiological contaminants and small dust particles from fluids. These rigid filters are brittle, exhibit essentially no elastic strain, and tend to break under the stress of deformation. Rigid filters can support a compressive axial load that is strong enough to form a seal when the filter is compressed at opposed ends; however, the brittle nature of the filter material precludes sufficient deformation of the filter to reduce porosity within compressed regions of the filter without inducing stress failure in the filter. A an O-ring or flexible sealant, such as silicone rubber, is typically used to form a compressible seal at the ends of the filter.

Semi-rigid filters include filter bodies that can withstand a compressive axial load which is strong enough to form a seal when the filter is compressed at opposed ends. Furthermore, semi-rigid filters are compressible to an extent that porosity and permeability are substantially reduced within the compressed region of the filter. This compression is capable of inducing stress failure if the compressive forces are too great. Light compressive forces cause elastic deformation while moderate compressive forces cause permanent deformation or crushing to an extent less than stress failure or breakage of the filter material. Thus, a degree of permanent crushing can occur before the filter breaks. Semi-rigid filters are typically made of fibers impregnated with permeable synthetic resins. Chemical treating agents may also be impregnated with these resins. Geometry of the filter bed may also play a structural role in providing a semi-rigid filter, e.g., cardboard or paper tubes form semi-rigid filters under this definition.

U.S. Pat. No. 5,580,447 shows an antimicrobial filtration cartridge having a knife-edge sealing mechanism that represents the primary sealing mechanism in use with rigid and semi-rigid filters. The cylindrical filter is manufactured with an axially oriented V-shaped groove at remote ends of the filter. The V-shaped grooves receive a corresponding knife-edge nib in the filtration cartridge body and a similar nib in an end piece sealing element. The end piece sealing element axially compresses the filter body to provide a seal involving the knife-edge nib and the V-shaped groove.

The total contact area between the knife-edge nib and the V-shaped groove is small with respect to the crossectional area of the filter, and this relationship provides a large pressure through the application of a relatively small force at the contact area. The small force is desirable because the filtration cartridge of the device shown in U.S. Pat. No. 5,580,447 is made of plastic, which tends to creep under a compressive load. Furthermore, the filter is made of a fiber-impregnated resin that also tends to creep under a compressive load. The filter is also subject to cyclic loading as fluids are forced through the filter. The filter ends are relatively weaker than other parts of the filter body because the resin-impregnated fiber matrix is discontinuous at the filter ends. Thus, the knife-edge seals tend to weaken and decay over time due to the effects of creep upon the small tolerances of the knife-edge seal, as well as and cyclic loading at a relatively weak portion of the filter. The weakened seals are increasingly prone to leakage, which defeats the purpose of using the cartridge.

There remains true need to develop a better sealing mechanism for semi-rigid filters.

SOLUTION

The present invention overcomes the problems that are outlined above, by providing an improved sealing mechanism for semi-rigid filters. This improvement is derived by compressing an entire end portion of the filter to reduce porosity and permeability in the filter, in contrast to the former use of a knife edge seal cutting into a localized portion the filter. The sealing structure advantageously permits large scale compression of the filter end portion without requiring the use of forces that cause plastic creep to degrade the seal.

A filtration cartridge according to the invention includes a cartridge body having an inlet and an outlet in fluidic communication with an internal cavity. A semi-rigid filter is operably positioned within the internal cavity for filtration of fluid. The semi-rigid filter has a first end portion and a second end portion. A special seal mechanism at the first and second end portions of the filter prevents leakage from bypassing the filter.

The special seal mechanism includes a sealing element having a swage channel, i.e., a channel that is capable of inducing deformation of the filter when one of the first and second end portions is being compressed within the swage channel. The swage channel includes a neck of width less than a thickness of the semi-rigid filter. The neck compressively engages the rigid filter to place a compressive axial load on the filter while deforming the filter in the region retained within the neck. The effect of filter deformation is to reduce porosity within the filter, and the porosity reduction is associated with a corresponding reduction in permeability.

Flow through the compressed portion of the filter within the neck is nonexistent because there is no pressure gradient in the neck. The lack of a pressure gradient is due to the neck geometry and a seal that forms between the neck and the filter as the filter is crushed into place. In the event that the seal between the neck and the filter deteriorates locally, leakage is still precluded or reduced by the necessity of flow traveling through the filter to reach the site of seal degradation and a substantial permeability reduction in the compressed region. The sealing effect of the swage channel is optimized where the compressive forces are sufficient to induce permanent or nonelastic deformation in the filter without exceeding the stress failure limits of the filter material, i.e., the filter is compressed to permanently reduce or eliminate porosity within the filter but not so much as to fracture the filter into separate pieces. The swage channel acts to retain the entire end portion of the filter and to prevent fracturing. Compression within the limits of elastic strain is also acceptable, but, depending upon the particular material involved, the compressive forces that are required to produce an adequate seal under elastic strain conditions can subject the plastic pieces holding the filter in place to relatively greater strain and a correspondingly increased amount of creep than is the case where nonelastic deformation is practiced.

The swage channel preferably includes a mouth having a width greater than the thickness of the semi-rigid filter. The mouth opens towards the semi-rigid filter and narrows towards the neck. The swage channel also preferably includes a rounded shoulder connecting the mouth with the neck. The rounded shoulder permits the application of greater compressive forces without a corresponding increase in the number of localized stress fractures in the filter.

Volumetric dimensions of the neck are preferably sufficient to form a reduced porosity at least thirty percent less than virgin porosity within portions of the semi-rigid filter that are not deformed. This reduced porosity is more preferably at least sixty percent less than virgin porosity within portions of the filter, and even more preferably at least ninety-five percent less than the virgin porosity.

DETAILED DESCRIPTION OF THE PREFERRED EMBODIMENT

Figure 1:
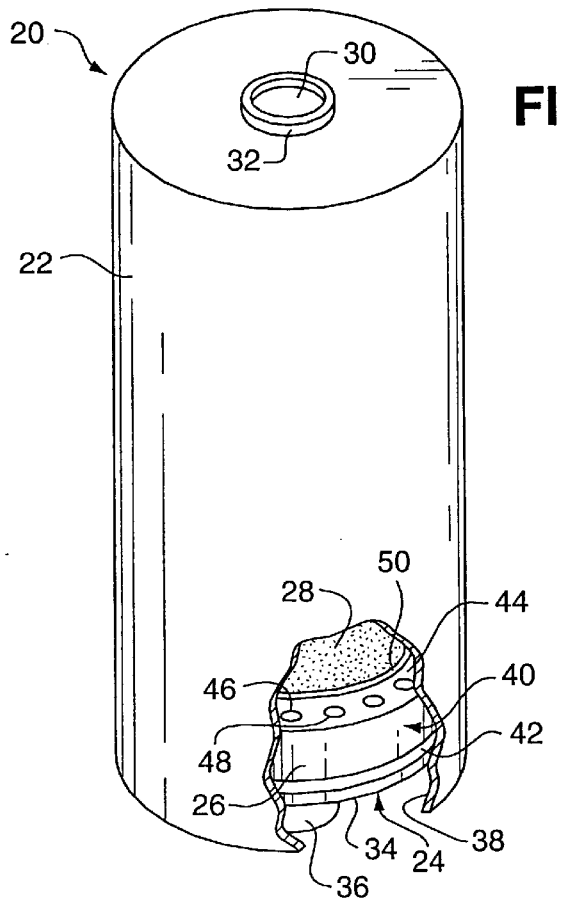
FIG. 1 depicts a front, top elevational perspective view of a filtration cartridge according to the present invention with an outer portion removed to reveal interior components of the cartridge.

FIG. 1 depicts filtration cartridge 20. The major components of filtration cartridge 20 include a cartridge body 22, an outlet plate 24, a sealing element 26, and a semi-rigid filter 28.

Cartridge body 22 includes structure defining an inlet opening 30, which is circumscribed by an elastomeric O-ring seal 32. The O-ring seal 32 flexibly conforms to a corresponding nipple (not depicted) that can be inserted to connect cartridge body to a water supply. The outlet plate 24 is made of a disk 34 having an outlet nipple 36. Outlet plate 24 is adhered or ultrasonically welded to an inner wall 38 of cartridge body 22, which causes outlet plate 24 to become part of cartridge body 22 in essential cooperation to form an interior cavity 40 within cartridge body 22. Thus, inlet opening 30 is in fluidic communication with outlet nipple 36 through interior cavity 40.

Sealing element 26 is a disk adhered to the inner wall 38 at a position above outlet plate 24 and separated from outlet plate 24 to provide a plenum 42 between outlet plate 24 and sealing element 26. A radially outboard portion 44 of sealing element 44 includes a plurality of holes, e.g., holes 46 and 48, connecting plenum 42 with the portion of interior chamber 40 that exists above sealing element 26. A ring-like swage channel 50 receives semi-rigid filter 28.

Semi-rigid filter 28 is any filter that can withstand a compressive axial load strong enough to form a seal when the filter is compressed at opposed ends, and which is deformably compressible to an extent that porosity and permeability is substantially reduced within the compressed region of the filter without breaking the deformed region away from the filter body. Examples of semi-rigid filters include synthetic resins that have been impregnated with fibers to form a fibrous labrynth depth filter, synthetic resins that have been impregnated with activated carbon, and cardboard bodies. As depicted in FIG. 1, semi-rigid filter 28 is cylindrically shaped.

Figure 2:
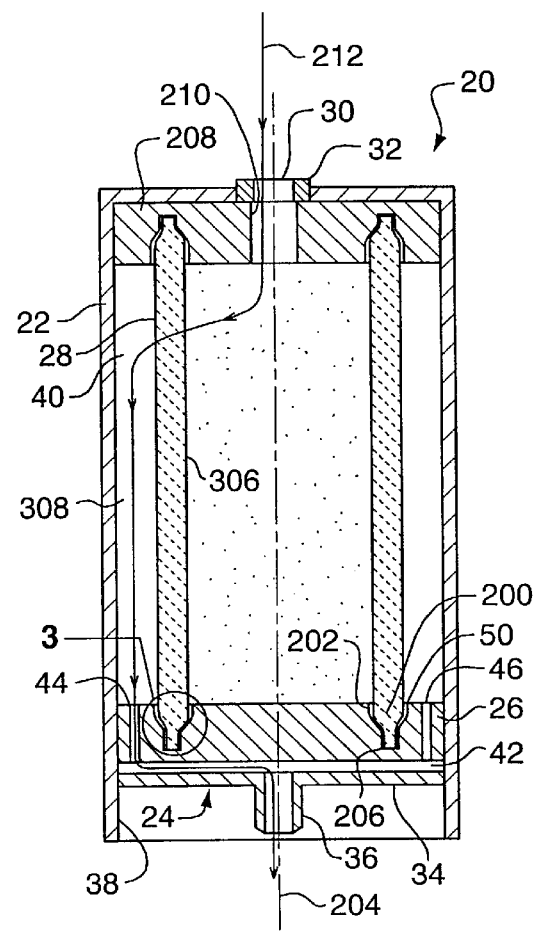
FIG. 2 depicts a midsectional view of the filtration cartridge including a pair of opposed swage channel sealing mechanisms.

FIG. 2 depicts a midsectional view of filtration cartridge 20 including additional detail with respect to FIG. 1. A first end 200 of semi-rigid filter 28 is received in swage channel 28. Swage channel 28 includes a mouth 202 having a width exceeding that of the semi-rigid filter 28 in a direction perpendicular to the axis of symmetry 204. Swage channel 50 also has a neck 206 of a width less than the thickness of the semi-rigid filter 28. Thus, compression of first end portion 200 to a smaller volume within neck 206 causes a reduction in porosity in the compressed porion of first end portion 200.

Figure 3:
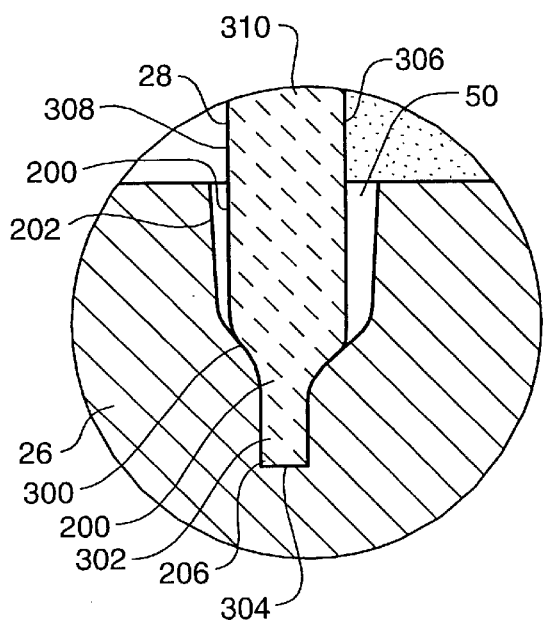
FIG. 3 depicts an expanded view including additional detail of a swage channel sealing mechanism shown in FIG. 2.

FIG. 3 provides additional detail of the sealing mechanism between swage channel 50 and filter 28, as shown in FIG. 3. Swage channel 50 includes a rounded shoulder 300 connecting mouth 202 and neck 206. Rounded shoulder 300 prevents stress fracturing of first end portion 200 as first end portion 200 is compressed over rounded shoulder 300 and within neck 206. The shoulder 300 preferably has a radius of curvature greater than one-half the thickness of semi-rigid filter 28. The volume of neck 206 is filled with a compressed section 302 of first end portion 200 to form a watertight seal at the contact junction 304 between sealing element 26 and first end portion 200. Due to the U-shaped geometry of neck 206, the seal at junction 304, and the reduced permeability and porosity in compressed section 302, there is insufficient pressure differential to induce flow between inlet side 306 and outlet side 308 of semi-rigid filter 28 across the region of neck 206.

The compressed section 302 has a reduced porosity, as compared to porosity within a virgin uncompressed portion 310 of semi-rigid filter 28. The reduced porosity is preferably at least thirty percent less than the virgin porosity, more preferably at least sixty percent less than the virgin porosity, and even more preferably at least ninety-five percent less than the virgin porosity. There is ideally zero porosity, but it is difficult to compress semi-rigid filter media to zero porosity without exceeding the stress failure limits of the material. The stress failure limits, as well as the elastic and nonelastic deformation limits differ according to the particular semi-rigid filter material that is selected, as well as the geometry of the material.

FIG. 2 depicts a second sealing element 208 opposite sealing element 26. Second sealing element 208 is identical to sealing element 26, except second sealing element 208 does not have holes 46 and 48, and second sealing element does have a central orifice 210 aligned with inlet opening 30 for communication with interior chamber 40.

In operation, liquid flows along pathway, which enters filtration cartridge 20 through inlet opening 30 and central orifice 210 into inlet side 306 of interior cavity 40. The seal at junction 304 forces pathway 212 through semi-rigid filter 28 and into outlet side 308 of interior cavity 40 for filtration of the liquid. Pathway 212 passes through the holes in sealing element 26, into plenum 42, and out nipple 36.

The preceding discussion identifies the preferred embodiment, which may be substituted by less preferred features. For example, second sealing element 208 may be integrally formed with cartridge body 22, as opposed to being a separately installed piece. The cylindrical geometry of filtration cartridge 20 may be replaced by square or rectangular geometries. It is also true that the operation of filtration cartridge 20 may be reversed with inlet opening 30 operating as an outlet in place of outlet nipple 36 for a reversal of direction along flowpath 212. Furthermore, there is a sometimes a distinction between filtration devices, which operate by mechanical means, and purification devices, which operate by chemical means. As used in this description, the term filter also includes purification agents where those agents also have a mechanical filtration effect or capability.

Those skilled in the art understand that the preferred embodiments described above may be subjected to apparent modification without departing from the scope and spirit of the invention. Accordingly, the inventors hereby state their intention to rely upon the Doctrine of Equivalents to protect their full rights in the invention.

We claim:

1. A filtration cartridge comprising:

a cartridge body having an inlet and an outlet in fluidic communication with an internal cavity;

a semi-rigid filter operably positioned within said internal cavity for filtration of fluid when said fluid is passing through said internal cavity between said inlet and said outlet, said semi-rigid filter having a first end portion and a second end portion remote from said first end portion; and means for sealing said first end portion and said second end portion of said semi-rigid filter to prevent leakage from bypassing said semi-rigid filter, said sealing means including a sealing element having a swage channel, one of said first and second end portions being received within said swage channel, said swage channel including a mouth having a width greater than a thickness of said semi-rigid filter, a neck of width less than said thickness of said semi-rigid filter, and an opposed pair of rounded shoulders connecting said mouth with said neck, said neck and said opposed pair of rounded shoulders compressively engaging said semi-rigid filter to place a compressive axial load on said semi-rigid filter while deforming said semi-rigid filter at said one of said first and second end portions to form a reduced porosity therein.

2. The filtration cartridge as set forth in claim 1 wherein said mouth opens towards said semi-rigid filter and narrows towards said neck.

3. The filtration cartridge as set forth in claim 1 wherein dimensions of said neck are sufficient to form said reduced porosity at least thirty percent less than virgin porosity within portions of said semi-rigid filter that are not deformed.

4. The filtration cartridge as set forth in claim 3 wherein dimensions of said neck are sufficient to form said reduced porosity at least sixty percent less than virgin porosity within portions of said semi-rigid filter that are not deformed.

5. The filtration cartridge as set forth in claim 4 wherein dimensions of said neck are sufficient to form said reduced porosity at least ninety-five percent less than virgin porosity within portions of said semi-rigid filter that are not deformed.

6. The filtration cartridge as set forth in claim 1 wherein said neck provides means for compressing said semi-rigid filter with sufficient force to minimize porosity within said one of said first and second end portions without causing stress failure of said semi-rigid filter.

7. The filtration cartridge as set forth in claim 1 wherein said semi-rigid filter is cylindrical and said swage channel has a ring configuration corresponding to said one of said first and second end portions.

8. The filtration cartridge as set forth in claim 1 including a second sealing element having a second swage channel opposite said first swage channel.

9. A method of making a filter cartridge from components including a cartridge body, a semi-rigid filter, and a sealing element having a swage channel including a mouth having a width greater than a thickness of said semi-rigid filter, a neck of width less than said thickness of said semi-rigid filter, and an opposed pair of rounded shoulders connecting said mouth with said neck, said method comprising the steps of:

inserting a semi-rigid filter into a cartridge body;

contacting said semi-rigid filter with said sealing element to place an end portion of said semi-rigid filter into said swage channel;

compressing said semi-rigid filter with said sealing element with sufficient compressive force to deform said semi-rigid filter within said swage channel and form an effective barrier to leakage at said end portion where said neck and said opposed pair of rounded shoulders compressively engage said semi-rigid filter to place a compressive axial load on said semi-rigid filter while deforming said semi-rigid filter to form a reduced porosity therein; and affixing said sealing element to said cartridge body.

* * * * *